United States Patent

[11] 3,540,468

[72] Inventor Frederick P. Finck, Jr.
Fairfield, Connecticut
[21] Appl. No. 784,088
[22] Filed Dec. 16, 1968
[45] Patented Nov. 17, 1970
[73] Assignee The Ruleta Company, Inc.
Bridgeport, Connecticut
a corporation of New York

[54] REMOVABLE SECTION OF SPLIT HOUSING BARES BOTH ENDS OF PLUG COCK SPINDLE
4 Claims, 9 Drawing Figs.

[52] U.S. Cl. ................................................ 137/383, 70/178, 85/5
[51] Int. Cl. ...................................................F16k 35/10, G05g 5/00, F16k 19/00
[50] Field of Search........................................ 85/5; 70/175, 178, 14, 34, 163, 164, 172, 173, 395; 137/383

[56] References Cited
UNITED STATES PATENTS

| | | | |
|---|---|---|---|
| 994,409 | 6/1911 | Kelly ............................ | 70/178 |
| 3,002,368 | 10/1961 | Moberg ........................ | 85/5X |
| 3,172,282 | 3/1965 | Heckrotte .................... | 70/178 |

FOREIGN PATENTS

| | | | |
|---|---|---|---|
| 906,832 | 9/1962 | Great Britain................ | 85/5 |

Primary Examiner—Henry T. Klinksiek
Attorney—Raymond D. Smith

ABSTRACT: A plug cock connected in a straight line of pipe has a port control plug spindle both of whose ends protrude from the body of the cock. The spindle is rotatable about an axis perpendicular to the line of the pipe. The cock is incased in a split housing comprising separable shell and cover sections at least one of which sections circumscribes an area as large as the profile of the cock that outlines the body of the cock and both of its protruding spindle ends. The housing sections are cuplike and meet rim to rim in a plane paralleling the axis of the plug spindle so that removal of only one of the housing sections exposes and makes accessible for operation or adjustment both protruding ends of the plug spindle. The housing sections are held releasably together by two plunger-type lockable draw fasteners each of which can slide telescopically into axially aligned bores in posts that are internal of the housing sections. The bore in one of the posts is shouldered to present a strike that interlocks with the fastener. The head of the fastener is nested protectively in the other post in a manner to expose only its end surface which has a keyhole admissive to a key for unlocking the fastener.

Patented Nov. 17, 1970
3,540,468
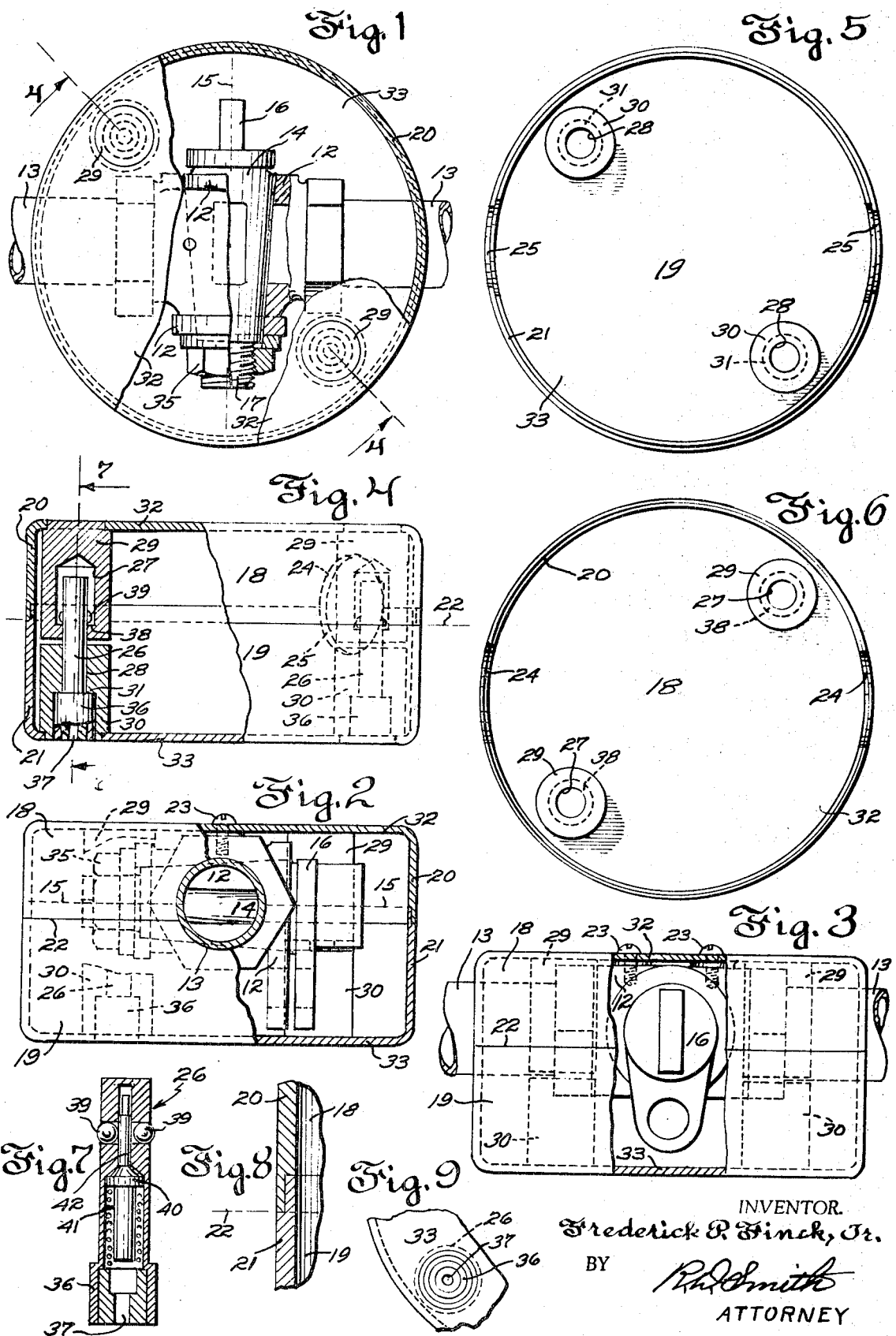

3,540,468

REMOVABLE SECTION OF SPLIT HOUSING BARES BOTH ENDS OF PLUG COCK SPINDLE

SUMMARY OF INVENTION

It is known to prevent unauthorized opening of a pipe installed valve, such as a plug cock, by incasing the valve or some part thereof in a locked-on housing divided into two separable sections for giving access to the valve. If one of such sections is permanently fastened to the valve or inseparable therefrom, as when pinioned between the valve and a closely flanking support wall or other mounting surface, only the other section of the housing can conveniently be removed.

According to this invention such a housing for a plug cock is divided into a shell section and a cover section at least one of which sections is cuplike and whose rims meet separably in a plane paralleling the axis of the rotary plug of the cock. One of said sections is removable from the other and encompasses an area large enough to expose, when removed, both ends of the plug spindle that project from the body of the cock. Access to both spindle ends is needed in order to both operate and service the plug in case of wear or dried out lubricant.

These and other objects of the improvements will appear in fuller detail from the following description of an embodiment of the invention having reference to the accompanying drawings, wherein:

FIG. 1 is a view of a pipe-installed plug cock incased in a split housing embodying the present improvements, parts of the housing being broken away to expose the plug spindle and both of its projecting ends.

FIG. 2 is a view looking from the right at FIG. 1 showing the housing partially broken away.

FIG. 3 is a view looking from the right at FIG. 2 with the housing partially broken away.

FIG. 4 is a view of the housing alone taken partially in section on the plane 4-4 in FIG. 1.

FIG. 5 is a view like FIG. 1 showing the shell section of the housing, the cock and the cover section of the housing being removed.

FIG. 6 is a view of the cover section of the housing detached from the shell section and inverted.

FIG. 7 is an enlarged view taken in section on the plane 7-7 in FIG. 4, showing one of the lockable fasteners removed from the casing.

FIG. 8 is a still further enlarged view of a portion of FIG. 4 showing the overlapping joindure of the sections of the split housing.

FIG. 9 is a detail view looking upward at a portion of FIG. 2 showing the keyhole in the end of the installed fastener.

In the drawings the body of a plug cock 12 is shown as installed in a straight line of pipe 13 leading a fluid medium such as gas from a utility line (not shown) to its place of consumption (not shown) in a residence or place of business. The cock is conventional in having a rotary spindle that includes in its length a conically tapered port control plug 14 whose axis of rotation 15 is perpendicular to the line of pipe 13. Both the handle end 16 and the adjusting end 17 of the plug spindle project from the cock body 12 at respectively opposite sides of the latter.

The cock body 12 together with both of said projecting spindle ends are incased by a housing that is split into a shell section 18 and a cover section 19, either or both of which sections may be of cuplike shape defined in part by cylindrical walls 20 and 21 whose rims meet separably on a plane 22 paralleling the axis 15 of the plug 14. The cylindrical casing walls are continuous with discal walls 32 and 33 and have interfitting rabbets at their rims which overlap telescopically in the plane 22 as shown in FIG. 8 for purposes later to be explained.

Complementary cutouts 24 and 25 in the cylindrical walls of the respective housing sections combine to form circular openings at diametrically opposite sides of the housing which openings closely fit and pass the pipe 13. The discal walls 32, 33 of each housing section are preferably flat and at least one of them, such as wall 32, closely flanks the body of the cock so that it can be fixedly secured thereto as by screws 23. This will maintain a designed position of the cock within the housing. The housing section 19 embraces an area that is as large as the overall profile shape of the cock body plus both of the projecting ends of the plug spindle. Such profile shape is that shown in FIG. 1. Hence it requires the removal of only housing section 19 to bare both of said ends of the plug spindle for operation or adjustment. Access to the spindle end 17 permits adjustive setting of nut 35 to vary the frictional opposition to turning of the plug by handle 16 offered by the conical seating of plug 14 in the cock body.

The casing sections are releasably held together by two lockable fasteners 26, one of which is shown detached from the housing in FIG. 7. Each fastener is of the sliding plunger type insertable in axially aligned bores 27 and 28 contained respectively in posts 29 and 30 that are rigid with the respective housing sections 18 and 19. To enable the walls of the housing sections to be light in weight and yet toughly resistant to breakage, the cylindrical and discal section walls are preferably drawn from sheet metal whereas the posts 29 and 30 are bodies of solid metal, each having a tenon lodged in the sheet metal of the discal wall and, if need be, welded in place.

The bore 28 in post 30 is counterbored at 31 to nest the head 36 of the fastener protectively so that there is exposed to the exterior of the housing only the end surface of said head containing the keyhole 37. The mating axially aligned bore 27 in post 29 is dead-ended and formed at its mouth with an internal shoulder 38 that serves as a strike to make retaining engagement with the bolting balls 39 of the fastener. Balls 39 can retract inwardly of the fastener so as to pass strike shoulder 38 but only when the plunger 40 is drawn toward the head 36 of the fastener against the resilient opposition of spring 41. The smallness of the gap between the free end of post 29 in shell section 18 and the proximate free end of post 30 in shell section 19 prevents either post from being driven out of its mounting in the sheet metal wall of the section for breaking the locking together of the sections.

An example of typical construction and locking function of this type of fastener by means of a special kind of key (not shown) is disclosed in fuller detail in U.S. Pat. No. 3,002,368, granted Oct. 3, 1961, to S. M. Moberg. The means by which fastener 26 holds together the housing sections is such that a little looseness may occur in the retaining engagement of bolting balls 39 and the strike shoulder 38, but axial play, if any, at this point is prevented from causing any opening between the housing sections because of the overlapping of walls shown in FIG. 8.

In operation, the shell section 18 of the housing may, or need not, be fixedly secured to the body 12 of the cock. The mating cover section 19 will be presented to meet the shell section edgewise so that the cylindrical walls of the sections overlap telescopically as in FIGS. 4 and 8 where the openings 24, 25 in the housing closely fit pipe 13. This positions the posts 29 and 30 circularly so that the concealed bores 27, 28 are in axial alignment. The fastener 26 is then unlocked by inserting in the keyhole 37 a key (not shown) that will attach to the plunger 40 of the fastener in a way to draw the plunger 40 toward the keyhole, thus removing the locking stem 42 of the plunger from blocking relation to the inward displacement of bolting balls 39. When the key is removed spring 41 restores the plunger 40 to its normal locking position. Until the fastener is next unlocked the housing sections can no not be separated.

I claim:

1. The combination with a cock installed in a service pipe and having a rotary port control plug of, a split housing comprising separable cup-shaped sections at least one of said sections encompassing both ends of said plug and both of said sections having peripheral walls including rim portions encompassing the cock and meeting in a plane parallel to the axis of rotation of said plug, said rim portions having matching cutouts entirely outside the structure of said cock snugly conforming to and substantially filled by said service pipe, a plurality of posts in each of said housing sections having mutually aligned bores, and an elongate fastener extending from one to the other of said aligned bores freely slidable therein and lockably engageable with at least one of said posts for holding said housing sections together.

2. The combination defined in claim 1, in which the said plug cock has a body whose shape includes four terminal branches, a plurality of said branches straddling one of the said housing posts in a manner to limit displacement of said housing from predetermined relation to said cock.

3. The combination defined in claim 2, in which two of the said body branches straddle each of the said pairs of housing posts.

4. The combination recited in claim 1, in which the said housing sections have relatively thin discal walls, and the said posts comprise relatively thick studs respectively mounted fixedly in the said discal walls and extending toward each other independently of the said peripheral walls of said housing sections.